US009647475B2

United States Patent
Sun et al.

(10) Patent No.: US 9,647,475 B2
(45) Date of Patent: May 9, 2017

(54) CHARGER, TERMINAL, CHARGING SYSTEM, AND CHARGING CONTROL METHOD

(71) Applicant: Xiaomi Inc., Beijing (CN)

(72) Inventors: Wei Sun, Beijing (CN); Hongtu Cui, Beijing (CN); Guoquan Zhang, Beijing (CN); Ji Yu, Beijing (CN)

(73) Assignee: Xiaomi Inc., Beijing (CN)

( * ) Notice: Subject to any disclaimer, the term of this patent is extended or adjusted under 35 U.S.C. 154(b) by 306 days.

(21) Appl. No.: 14/456,360

(22) Filed: Aug. 11, 2014

(65) Prior Publication Data

US 2015/0091499 A1    Apr. 2, 2015

Related U.S. Application Data

(63) Continuation of application No. PCT/CN2014/077004, filed on May 8, 2014.

(30) Foreign Application Priority Data

Sep. 30, 2013   (CN) .......................... 2013 1 0462373

(51) Int. Cl.
*H02J 7/04*    (2006.01)
*H02J 7/00*    (2006.01)

(52) U.S. Cl.
CPC ............ *H02J 7/0052* (2013.01); *H02J 7/041* (2013.01); *H02J 2007/0001* (2013.01); *H02J 2007/0062* (2013.01)

(58) Field of Classification Search
CPC ....................................................... H02J 7/04
(Continued)

(56) References Cited

U.S. PATENT DOCUMENTS 6,362,610 B1   3/2002 Yang
6,977,486 B2  12/2005 Choi
(Continued)

FOREIGN PATENT DOCUMENTS

CN       1487646      4/2004
CN     101399386      4/2009
(Continued)

OTHER PUBLICATIONS

International Search Report of PCT/CN2014/077004, mailed from the State Intellectual Property Office of China on Aug. 20, 2014.
(Continued)

*Primary Examiner* — Samuel Berhanu
*Assistant Examiner* — Tessema Kebede
(74) *Attorney, Agent, or Firm* — Finnegan, Henderson, Farabow, Garrett & Dunner LLP

(57) ABSTRACT

A charger for charging a terminal, includes: a power supply device configured to output a direct current (DC) charging current, the power supply device including a voltage output port and a feedback receiving port; a charging port configured to connect to the terminal, and to output the DC charging current from the power supply device to the terminal, the charging port including a power supply port and a data signal port, the power supply port being connected to the voltage output port and configured to output the DC charging current to the terminal; a charging control device; and a switch device provided between the feedback receiving port and the charging port, and configured to connect the feedback receiving port to the power supply port or the data signal port according to control of the charging control device.

16 Claims, 6 Drawing Sheets

(58) Field of Classification Search
USPC .......................................................... 320/107
See application file for complete search history.

(56) References Cited

U.S. PATENT DOCUMENTS

| | | | | |
|---|---|---|---|---|
| 8,618,769 | B2 * | 12/2013 | Johnson | ................. G06F 1/266 |
| | | | | 320/107 |
| 2004/0066174 | A1 | 4/2004 | Choi | |
| 2005/0189909 | A1 * | 9/2005 | Guthrie | ................. G06F 1/263 |
| | | | | 320/107 |
| 2007/0046268 | A1 * | 3/2007 | Irie | ..................... H02J 7/0073 |
| | | | | 323/202 |
| 2010/0202161 | A1 | 8/2010 | Sims et al. | |
| 2013/0015808 | A1 | 1/2013 | Lee | |
| 2013/0099745 | A1 * | 4/2013 | Johnson | ................. G06F 1/266 |
| | | | | 320/114 |
| 2013/0141035 | A1 * | 6/2013 | Tam | ..................... H02J 7/0068 |
| | | | | 320/107 |
| 2014/0084850 | A1 * | 3/2014 | Lee | ........................ G06F 1/266 |
| | | | | 320/107 |

FOREIGN PATENT DOCUMENTS

| | | |
|---|---|---|
| CN | 102684271 A | 9/2012 |
| CN | 202651863 | 1/2013 |
| CN | 103208850 A | 7/2013 |
| CN | 103475068 | 12/2013 |
| JP | 10-174300 A | 6/1998 |
| JP | 2011-150584 | 8/2011 |
| RU | 2325015 C1 | 5/2008 |
| RU | 119540 U1 | 8/2012 |

OTHER PUBLICATIONS

English version of International Search Report of PCT/CN2014/077004, mailed from the State Intellectual Property Office of China on Aug. 20, 2014.

Office Action for Russian Application No. 2015123128/07(036100), mailed from the Russian Federal Service for Intellectual Property on Jun. 29, 2016.

* cited by examiner

CHARGER, TERMINAL, CHARGING SYSTEM, AND CHARGING CONTROL METHOD

CROSS REFERENCE TO RELATED APPLICATIONS

This application is a continuation of International Application No. PCT/CN2014/077004, filed May 8, 2014, which claims priority to Chinese Patent Application No. 201310462373.6, filed Sep. 30, 2013, the entire contents of all of which are incorporated herein by reference.

TECHNICAL FIELD

The present disclosure generally relates to the technology field of terminal charging and, more particularly, to a charger, a terminal, a charging system and a charging control method.

BACKGROUND

An output voltage for a charger specified by an international standard is typically 5±5% V, i.e., 4.74 V-5.25 V. A universal serial bus (USB) wire for connecting a mobile phone to the charger generally has a resistance, usually 0.2Ω for a premium USB wire, and 0.3-0.4Ω for an ordinary one. Thus, in a case in which a charging current is 1 A, a voltage drop across the USB wire will be more than or equal to 0.2 V. In view that there is another voltage drop of about 0.1 V on a printed circuit board (PCB) in the mobile phone, an input voltage to a charging management chip of the mobile phone can be less than 4.7 V. As a result, the voltage actually output from the charger to the charging management chip of the mobile phone may not meet the international standard.

Conventionally, under a charging management chip with an efficiency of 90%, a 4.2 V battery may be charged to 4.2 V in a fast charging phase (the charging current being 1 A). However, a 4.35 V high voltage battery may not be charged to 4.35 V in the fast charging phase because the input voltage to the charging management chip of the mobile phone may not reach about 4.85 V.

SUMMARY

According to a first aspect of the present disclosure, there is provided a charger for charging a terminal, comprising: a power supply device configured to output a direct current (DC) charging current by rectifying and reducing a voltage of an input alternating current (AC), the power supply device including a voltage output port and a feedback receiving port, the voltage output port being configured to output the DC charging current, the feedback receiving port being configured to receive a feedback signal to adjust the output DC charging current; a charging port configured to connect to the terminal, and to output the DC charging current from the power supply device to the terminal, the charging port including a power supply port and a data signal port, the power supply port being connected to the voltage output port and configured to output the DC charging current to the terminal; a charging control device; and a switch device provided between the feedback receiving port and the charging port, and configured to connect the feedback receiving port to the power supply port or the data signal port according to control of the charging control device.

According to a second aspect of the present disclosure, there is provided a terminal to be charged by a charger, comprising: a charging management chip configured to receive an input direct current (DC) charging current to charge the terminal, the charging management chip including a voltage input port and a chip data port, the voltage input port being configured to receive the input DC charging current; a charging port configured to connect to the charger to receive a DC charging current from the charger as the input DC charging current to the charging management chip, the charging port including a power supply port and a data signal port, the power supply port being connected to the voltage input port and configured to output the received DC charging current to the charging management chip; a charging control device; and a switch device provided between the charging management chip and the charging port, and configured to connect the data signal port to the voltage input port or the chip data port according to control of the charging control device.

According to a third aspect of the present disclosure, there is provided a charging system, comprising: a terminal; and a charger configured to charge the terminal. The charger comprises: a power supply device configured to output a direct current (DC) charging current by rectifying and reducing a voltage of an input alternating current (AC), the power supply device including a voltage output port and a feedback receiving port, the voltage output port being configured to output the DC charging current, and the feedback receiving port being configured to receive a feedback signal to adjust the output DC charging current; a first charging port configured to connect to the terminal, and to output the DC charging current from the power supply device to the terminal, the first charging port including a first power supply port and a first data signal port, the first power supply port being connected to the voltage output port and configured to output the DC charging current to the terminal; a first charging control device; and a first switch device provided between the feedback receiving port and the first charging port, and configured to connect the feedback receiving port to the first power supply port or the first data signal port according to control of the first charging control device. The terminal comprises: a charging management chip configured to receive an input DC charging current to charge the terminal, the charging management chip including a voltage input port and a chip data port, the voltage input port being configured to receive the input DC charging current; a second charging port configured to connect to the charger to receive the DC charging current from the charger as the input DC charging current to the charging management chip, the second charging port including a second power supply port and a second data signal port, the second power supply port being connected to the voltage input port, and configured to output the received DC charging current to the charging management chip; a second charging control device; and a second switch device provided between the charging management chip and the second charging port, and configured to connect the second data signal port to the voltage input port or the chip data port according to control of the second charging control device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
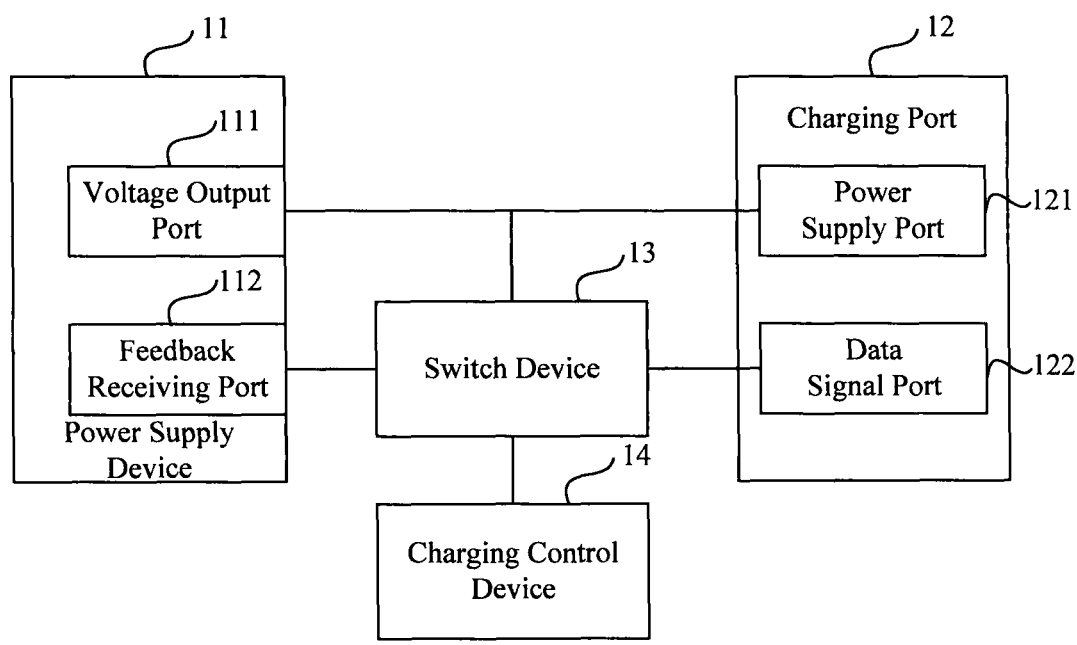
FIG. 1 is a block diagram of a charger, according to an exemplary embodiment.

FIG. 1 is block diagram of a charger 10, according to an exemplary embodiment. Referring to FIG. 1, the charger 10 includes a power supply device 11, a charging port 12, a switch device 13, and a charging control device 14.

The power supply device 11 is configured to output a direct current (DC) charging current by rectifying and reducing a voltage of an input alternating current (AC). The power supply device 11 includes at least a voltage output port 111 and a feedback receiving port 112. The voltage output port 111 is configured to output the DC charging current. The feedback receiving port 112 is configured to receive a feedback signal to adjust the output DC charging current.

The charging port 12 is configured to connect with a terminal, to output the output DC charging current to the terminal. The charging port 12 includes at least a power supply port 121 and a data signal port 122. The power supply port 121 is connected to the voltage output port 111, and configured to output the DC charging current to the terminal.

The switch device 13 is provided between the feedback receiving port 112 and the charging port 12, and is configured to connect the feedback receiving port 112 to the power supply port 121 or the data signal port 122 according to control of the charging control device 14.

In this embodiment, by utilizing the data signal port 122 of the charger 10 to obtain the feedback signal from the terminal, a voltage drop across a universal serial bus (USB) wire between the terminal and the charger can be eliminated, such that a charging voltage of, e.g., 5±5% V, may be obtained by the terminal. Thus, a high voltage battery, such as a 4.35 V battery, may be fast charged with a substantially constant current in the terminal.

In exemplary embodiments, the charger 10 can be in a first feedback state, referred to herein as a proximal feedback state, or a second feedback state, referred to herein as a distal feedback state. When the charger 10 is in the proximal feedback state, the switch device 13 connects the feedback receiving port 112 to the power supply port 121 according to control of the charging control device 14. When the charger 10 is in the distal feedback state, the switch device 13 connects the feedback receiving port 112 to the data signal port 122 according to control of the charging control device 14.

In exemplary embodiments, at a start of a charging operation, the terminal determines a type of the charger 10 through a connection state of the data signal port 122 and a data signal port of the terminal. At this time, the charger 10 may not obtain the feedback signal through the data signal port 122, but can obtain the feedback signal through the power supply port 121. When the terminal determines the type of the charger 10, the data signal port 122 of the charger 10 and the data signal port of the terminal are free. Thus, the feedback signal may be transmitted through the data signal port of the terminal and the data signal port 122 of the charger 10. In this embodiment, by setting the first and second states for the charger 10, at the time of the normal charging operation of the charger 10, a voltage drop across the USB wire between the terminal and the charger can be eliminated, such that a charging voltage of 5±5% V may be obtained by the terminal. Thus, the high voltage battery may be fast charged with a substantially constant current.

In one exemplary embodiment, the data signal port 122 includes a D+ port and a D− port as defined in a USB interface. When the charger 10 is in the distal feedback state, the switch device 13 connects the feedback receiving port 112 to the D+ port or the D− port according to control of the charging control device 14.

In this embodiment, by utilizing the D+ port or the D− port of the charger 10 to transmit the feedback signal from a charging management chip of the terminal to the charger 10, the voltage drop across the USB wire between the terminal and the charger can be eliminated, such that a charging voltage of 5±5% V may be obtained at a voltage input port of the charging management chip of the terminal. Thus, the high voltage battery may be fast charged with a substantially constant current.

The charging control device 14 is configured to control the charger 10 to be in the proximal feedback state when the charging operation is started, and control the charger 10 to be in the distal feedback state when a duration of the charging operation exceeds a preset time period. By monitoring the duration of the charging operation, whether the charger 10 is in the proximal feedback state or the distal feedback state may be determined, such that the feedback signal may be received from different ports. By obtaining the feedback signal from the terminal, the voltage drop across the USB wire between the terminal and the charger can be eliminated, such that a charging voltage of 5±5% V may be obtained at the voltage input port of the charging management chip of the terminal. Thus, the high voltage battery may be fast charged with a substantially constant current.

In exemplary embodiments, the charging port 12 can be a USB interface or a micro USB interface. Whether the charging port 12 is the USB interface or the micro USB interface, the feedback signal may be obtained from the terminal through the solution of the above embodiments, to eliminate the voltage drop across the USB wire between the terminal and the charger 10, such that a charging voltage of 5±5% V may be obtained at the voltage input port of the charging management chip of the terminal. Thus, the high voltage battery may be fast charged with a substantially constant current.

Figure 2:
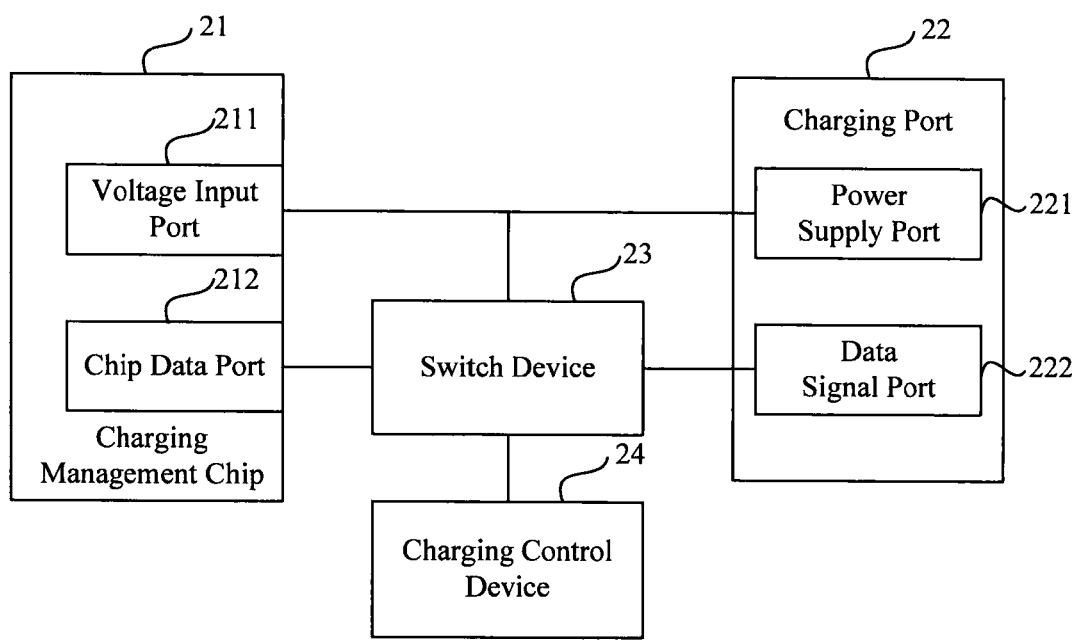
FIG. 2 is a block diagram of a terminal, according to an exemplary embodiment.

FIG. 2 is a block diagram of a terminal 20, according to an exemplary embodiment. For example, the terminal 20 may be a smart electronic terminal, such as a mobile phone, a computer tablet, etc. Referring to FIG. 2, the terminal 20 includes a charging management chip 21, a charging port 22, a switch device 23, and a charging control device 24.

The charging management chip 21 is configured to receive an input DC charging current to charge the terminal 20. The charging management chip 21 includes at least a voltage input port 211 configured to input the DC charging current, and a chip data port 212.

The charging port 22 is configured to connect with a charger, such as the charger 10 (FIG. 1), to receive the DC charging current from the charger. The charging port 22 includes at least a power supply port 221 and a data signal port 222. The power supply port 221 is connected to the voltage input port 211 and configured to output the DC charging current to the charging management chip 21.

The switch device 23 is provided between the charging management chip 21 and the charging port 22, and is configured to connect the data signal port 222 to the voltage input port 211 or the chip data port 212 according to control of the charging control device 24.

In this embodiment, by utilizing the data signal port 222 of the terminal 20 to transmit a feedback signal to the charger, a voltage drop across the USB wire between the terminal and the charger can be eliminated, such that a charging voltage of 5±5% V may be obtained at the voltage input port 211 of the charging management chip 21. Thus, a high voltage battery, such as a 4.35 V battery, may be fast charged with a substantially constant current.

In exemplary embodiments, the terminal 20 can be in a first state, referred to herein as a proximal feedback state, or a second state, referred to herein as a distal feedback state. When the terminal 20 is in the proximal feedback state, the switch device 23 connects the data signal port 222 to the chip data port 212 according to control of the charging control device 24. When the terminal 20 is in the distal feedback state, the switch device 23 connects the data signal port 222 to the voltage input port 211 according to control of the charging control device 24.

In exemplary embodiments, at a start of a charging operation, the terminal 20 determines a type of the charger through a connection state of the data signal port 222 with a data signal port of the charger, such as the data signal port 122 of the charger 10 (FIG. 1). At this time, the terminal 20 may not send the feedback signal through the data signal port 222, and the charger can obtain the feedback signal through a power supply port of the charger, such as the power supply port 121 of the charger 10 (FIG. 1). When the terminal 20 determines the type of the charger, the data signal port 222 of the terminal 20 and the data signal port of the charger are free. Thus, the feedback signal may be transmitted through the data signal port 222 of the terminal 20 and the data signal port of the charger. In this embodiment, by setting the first and second states for the terminal 20, at the time of the normal charging operation, the voltage drop across the USB wire between the terminal and the charger can be eliminated, such that a charging voltage of 5±5% V may be obtained by the terminal 20. Thus, the high voltage battery may be fast charged with a substantially constant current.

In one exemplary embodiment, the data signal port 222 includes a D+ port and a D− port. When the terminal 20 is in the proximal feedback state, the switch device 23 connects the D+ port or the D− port to the chip data port 212 according to control of the charging control device 24. When the terminal 20 is in the distal feedback state, the switch device 23 connects the D+ port or the D− port to the voltage input port 211 according to control of the charging control device 24.

In this embodiment, by utilizing the D+ port or the D− port of the terminal 20 to transmit the feedback signal from the charging management chip 21 to the charger, the voltage drop across the USB wire between the terminal and the charger can be eliminated, such that a charging voltage of 5±5% V may be obtained at the voltage input port 211 of the charging management chip 21. Thus, the high voltage battery may be fast charged with a substantially constant current.

The charging control device 24 is configured to control the terminal 20 to be in the proximal feedback state when the charging operation is started, and control the terminal 20 to be in the distal feedback state when a duration of the charging operation exceeds a preset time period. By monitoring the duration of the charging operation, whether the terminal 20 is in the proximal feedback state or the distal feedback state may be determined, so as to transmit the feedback signal to the charger. By obtaining the feedback signal from the charging port 22 of the terminal 20, the voltage drop across the USB wire between the terminal and the charger can be eliminated, such that a charging voltage of 5±5% V may be obtained at the voltage input port 211 of the charging management chip 21. Thus, the high voltage battery may be fast charged with a substantially constant current.

In exemplary embodiments, the charging port 22 is a USB interface or a micro USB interface. Whether the charging port 22 is the USB interface or the micro USB interface, the feedback signal may be obtained from the terminal 20 through the solution of the above embodiments, to eliminate the voltage drop across the USB wire between the terminal 20 and the charger, such that a charging voltage of 5±5% V may be obtained at the voltage input port 211 of the charging management chip 21. Thus, the high voltage battery may be fast charged with a substantially constant current.

Figure 3:
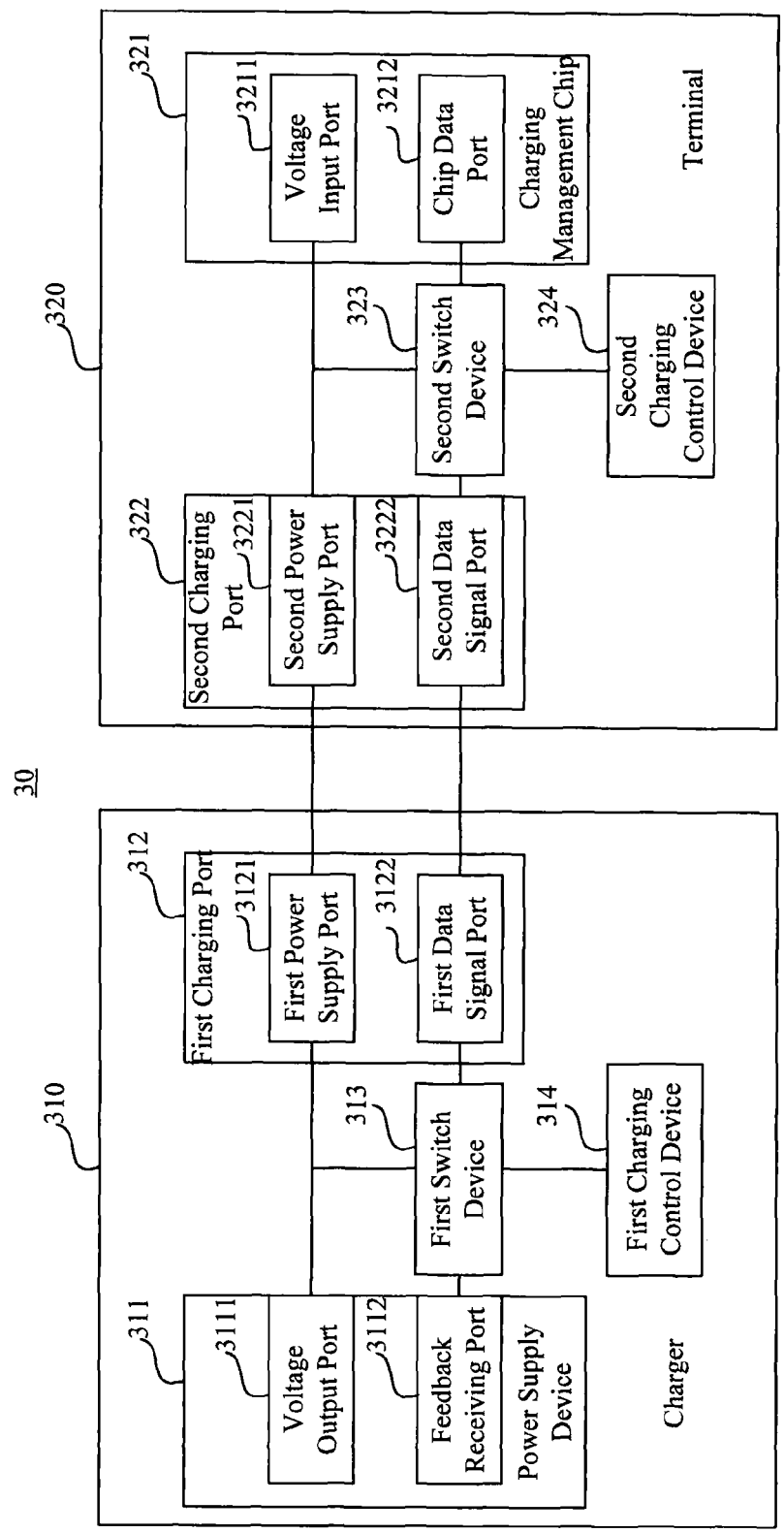
FIG. 3 is a block diagram of a charging system, according to an exemplary embodiment.

FIG. 3 is block diagram of a charging system 30, according to an exemplary embodiment. Referring to FIG. 3, the system 30 includes a charger 310 and a terminal 320. The charger 310 is connected with the terminal 320, to charge the terminal 320.

In exemplary embodiments, the charger 310 includes a power supply device 311, a first charging port 312, a first switch device 313, and a first charging control device 314. The charger 310 operates in a similar manner to the charger 10 (FIG. 1).

The power supply device 311 is configured to output a DC charging current by rectifying and reducing a voltage of an input AC charging current. The power supply device 11 includes at least a voltage output port 3111 and a feedback receiving port 3112. The voltage output port 3111 is configured to output the DC charging current. The feedback receiving port 3112 is configured to receive a feedback signal to adjust the output DC charging current.

The first charging port 312 is configured to connect to the terminal 320, to output the output DC charging current to the terminal 320. The first charging port 312 includes at least a first power supply port 3121 and a first data signal port 3122. The first power supply port 3121 is connected to the voltage output port 3111, and is configured to output the DC charging current to the terminal 320.

The first switch device 313 is provided between the feedback receiving port 3112 and the first charging port 312, and is configured to connect the feedback receiving port 3112 to the first power supply port 3121 or the first data signal port 3122 according to control of the first charging control device 314.

In exemplary embodiments, the terminal 320 includes a charging management chip 321, a second charging port 322, a second switch device 323, and a second charging control device 324. The terminal 320 operates in a similar manner to the terminal 20 (FIG. 2).

The charging management chip 321 is configured to receive the input DC charging current to charge the terminal 320. The charging management chip 321 includes at least a voltage input port 3211 configured to input the DC charging current, and a chip data port 3212.

The second charging port 322 is configured to connect with the charger 310, to receive the DC charging current from the charger 310. The second charging port 322 includes at least a second power supply port 3221 and a second data signal port 3222. The second power supply port 3221 is connected to the voltage input port 3211 and configured to output the DC charging current to the charging management chip 321.

The second switch device 323 is provided between the charging management chip 321 and the second charging port 322, and is configured to connect the second data signal port 3222 to the voltage input port 3211 or the chip data port 3212 according to control of the second charging control device 324.

In exemplary embodiments, the charging system 30 can be in a first state, referred to herein as a proximal feedback state, and a second state, referred to herein as a distal feedback state.

When the charging system 30 is in the proximal feedback state, the first switch device 313 connects the feedback receiving port 3112 to the first power supply port 3121 according to control of the first charging control device 314, and the second switch device 323 connects the second data signal port 3222 to the chip data port 3212 according to control of the second charging control device 324.

When the charging system 30 is in the distal feedback state, the first switch device 313 connects the feedback receiving port 3112 to the first data signal port 3122 according to control of the first charging control device 314, and the second switch device 323 connects the second data signal port 3222 to the voltage input port 3211 according to control of the second charging control device 324.

In exemplary embodiments, each of the first data signal port 3122 and the second data signal port 3222 includes a D+ port and a D− port as defined in a USB interface.

In one exemplary embodiment, when the charging system 30 is in the proximal feedback state, the second switch device 323 connects the D+ port of the second data signal port 3222 to the chip data port 3212 according to control of the second charging control device 324. Accordingly, when the charging system 30 is in the distal feedback state, the first switch device 313 controls the feedback receiving port 3112 to the D+ port of the first data signal port 3122 according to control of the first charging control device 314; and the second switch device 323 controls the D+ port of the second data signal port 3222 to the voltage input port 3211 according to control of the second charging control device 324.

In one exemplary embodiment, when the charging system 30 is in the proximal feedback state, the second switch device 323 connects the D− port of the second data signal port 3222 to the chip data port 3212 according to control of the second charging control device 324. Accordingly, when the charging system 30 is in the distal feedback state, the first switch device 313 connects the feedback receiving port 3112 to the D− port of the first data signal port 3122 according to control of the first charging control device 314; and the second switch device 323 controls the D− port of the second data signal port 3222 to the voltage input port 3211 according to control of the second charging control device 324.

The first charging control device 314 is configured to control the charger 310 to be in the proximal feedback state when a charging operation is started, and control the charger 310 to be in the distal feedback state when a duration of the charging operation exceeds a preset time period. The second charging control device 324 is configured to control the terminal 320 to be in the proximal feedback state when the charging operation is started, and control the terminal 320 to be in the distal feedback state when the duration of the charging operation exceeds a preset time period. For example, the preset time periods for the first charging control device 314 and the second charging control device 324 are the same.

In exemplary embodiments, the first charging port 312 can be a USB interface or a micro USB interface, and the second charging port 322 can be a USB interface or a micro USB interface.

The first charging port 312 of the charger 310 and the second charging port 322 of the terminal 320 may be the same type of port or different types of ports. For example, the two ends of the USB wire between the charger 310 and the terminal 320 may be the same type of ports or different types of ports.

Figure 4:
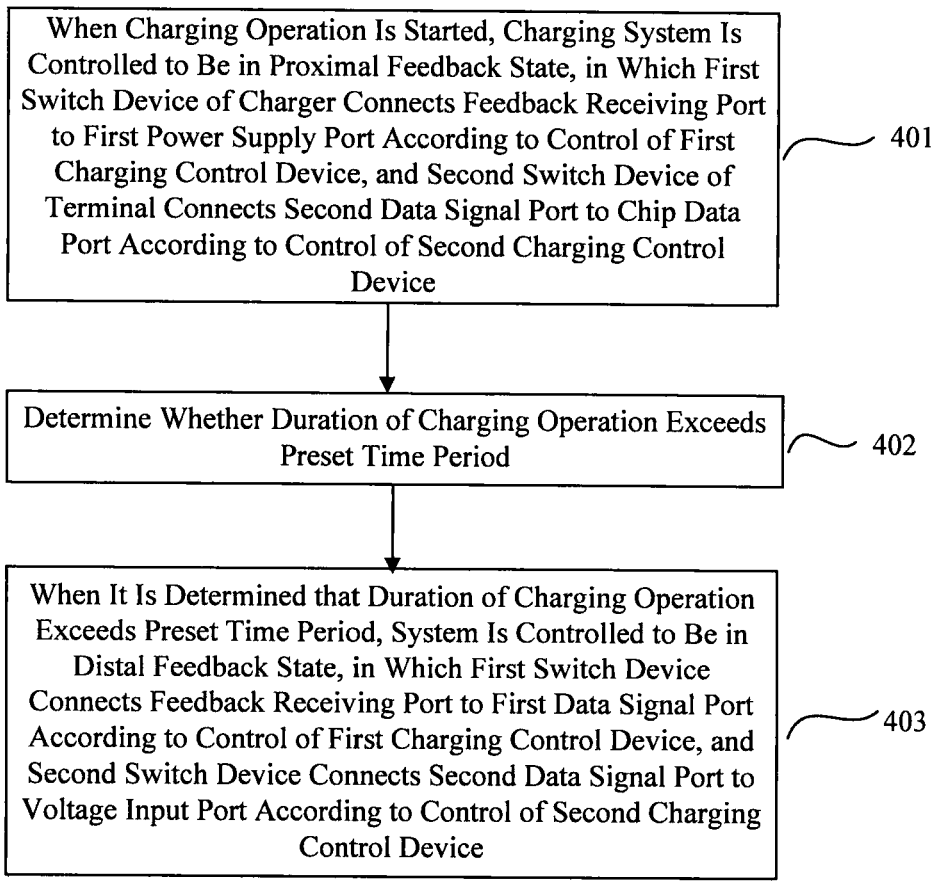
FIG. 4 is a flowchart of a charging control method, according to an exemplary embodiment.

FIG. 4 is a flowchart of a charging control method 400 for use in the charging system 30 (FIG. 3), according to an exemplary embodiment. Referring to FIGS. 3 and 4, the method 400 includes the following steps.

In step 401, when a charging operation is started, the charging system 30 is controlled to be in the proximal feedback state, in which the first switch device 313 of the charger 310 connects the feedback receiving port 3112 to the first power supply port 3121 according to control of the first charging control device 314, and the second switch device 323 of the terminal 320 connects the second data signal port 3222 to the chip data port 3212 according to control of the second charging control device 324.

In step 402, it is determined whether a duration of the charging operation exceeds a preset time period.

In step 403, when it is determined that the duration of the charging operation exceeds the preset time period, the system 30 is controlled to be in the distal feedback state, in which the first switch device 313 connects the feedback receiving port 3112 to the first data signal port 3122 according to control of the first charging control device 314, and the second switch device 324 connects the second data signal port 3222 to the voltage input port 3211 according to control of the second charging control device 324.

In exemplary embodiments, each of the first and second data signal ports 3122 and 3222 includes a D+ port and a D− port.

In one exemplary embodiment, when the charging system 30 is in the proximal feedback state, the second switch device 323 connects the D+ port of the second data signal port 3222 to the chip data port 3212 according to control of the second charging control device 324. Accordingly, when the charging system 30 is in the distal feedback state, the first switch device 313 connects the feedback receiving port 3112 to the D+ port of the first data signal port 3122 according to control of the first charging control device 314, and the second switch device 323 connects the D+ port of the second data signal port 3222 to the voltage input port 3211 according to control of the second charging control device 324.

In one exemplary embodiment, when the charging system 30 is in the proximal feedback state, the second switch device 323 connects the D− port of the second data signal port 3222 to the chip data port 3212 according to control of the second charging control device 324. Accordingly, when the charging system 30 is in the distal feedback state, the first switch device 313 connects the feedback receiving port 3112 to the D− port of the first data signal port 3122 according to control of the first charging control device 314.

Figure 5:
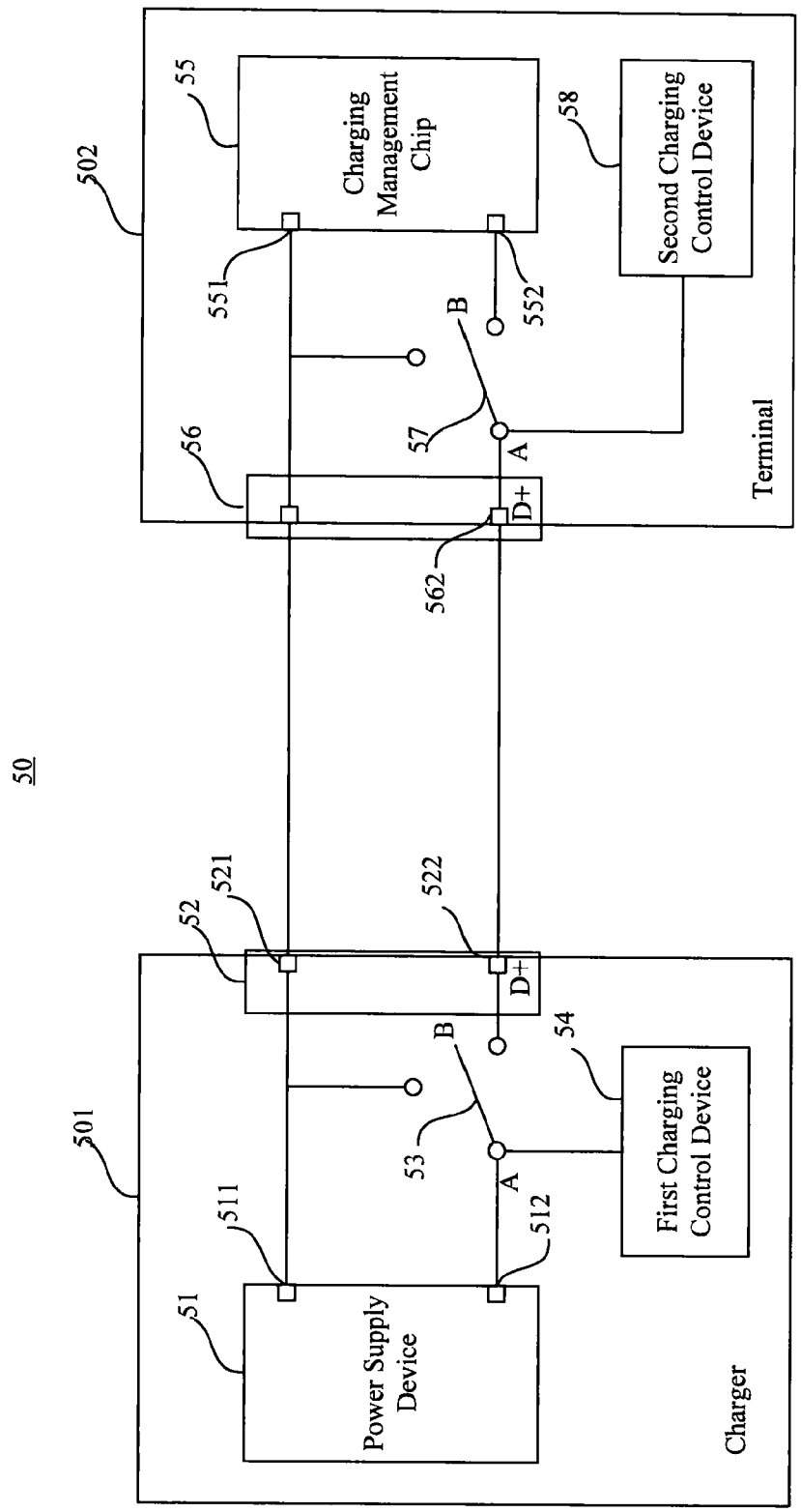
FIG. 5 is a block diagram of a charging system, according to an exemplary embodiment.

FIG. 5 is block diagram of a charging system 50, according to an exemplary embodiment. Referring to FIG. 5, the system 50 includes a charger 501 and a terminal 502, the charger 501 being configured to charge the terminal 502. The charger 501 includes a power supply device 51, a first charging port 52, a first switch device 53, and a first charging control device 54. The terminal 502 includes a charging management chip 55, a second charging port 56, a second switch device 57, and a second charging control device 58. The system 50 operates in a manner similar to the above description in connection with the system 30 (FIG. 3). In the system 50, a feedback signal is transmitted between the charger 501 and the terminal 502 through D+ ports.

For example, the first switch device 53 of the charger 501 may be a single-pole double-throw (SPDT) switch. An end A of the SPDT switch 53 is connected with a feedback receiving port 512 of the power supply device 51, and an end B of the SPDT switch 53 is connected to a first power supply port 521 or a D+ port 522 of the first charging port 52 according to control of the first charging control device 54. When a charging operation is started, the first charging control device 54 controls the end B of the SPDT switch 53 to be connected to the first power supply port 521 of the first charging port 52. After the charging operation lasts for a preset period, the first charging control device 54 controls the end B of the SPDT switch 53 to be connected to the D+ port 522 of the first charging port 52.

The second switch device 57 of the terminal 502 may also be a SPDT switch. An end A of the SPDT switch 57 is connected with a D+ port 562 of the second charging port 56, and an end B of the SPDT switch 57 is connected to a voltage input port 551 or a chip data port 552 of the charging management chip 55 according to control of the second charging control device 58. When the charging operation is started, the second charging control device 58 controls the end B of the SPDT switch 57 to be connected to the chip data port 552 of the charging management chip 55. After the charging operation lasts for the preset period, the second charging control device 58 controls the end B of the SPDT switch 57 to be connected to the voltage input port 551 of the charging management chip 55.

In this embodiment, the feedback signal is not directly transmitted to a voltage output port 511 of the power supply device 51, but to the SPDT switch 53. The end B of the SPDT switch 53 may be connected to the first power supply port 521 or the D+ port 522 according to control of the control of the first charging control device 54.

The SPDT switch 57 is included in the terminal 502. The end A of the SPDT switch 57 is connected to the D+ port 562 of the second charging port 56 (to be consistent with the charger 501), and the end B of the SPDT switch 57 is connected to the voltage input port 551 or the chip data port 552 of the charging management chip 55.

In this embodiment, by transmitting the feedback signal through the connection between the D+ ports of the charger 501 and the terminal 502 after the charging operation lasts for the preset period, so as to allow the feedback signal to reflect the voltage drop across the USB wire between the charger 501 and the terminal 502, the voltage drop across the USB wire between the terminal 502 and the charger 501 will be eliminated, such that a charging voltage of 5±5% V may be obtained at the voltage input port 551 of the charging management chip 55. Thus, the high voltage battery may be fast charged with a substantially constant current.

Figure 6:
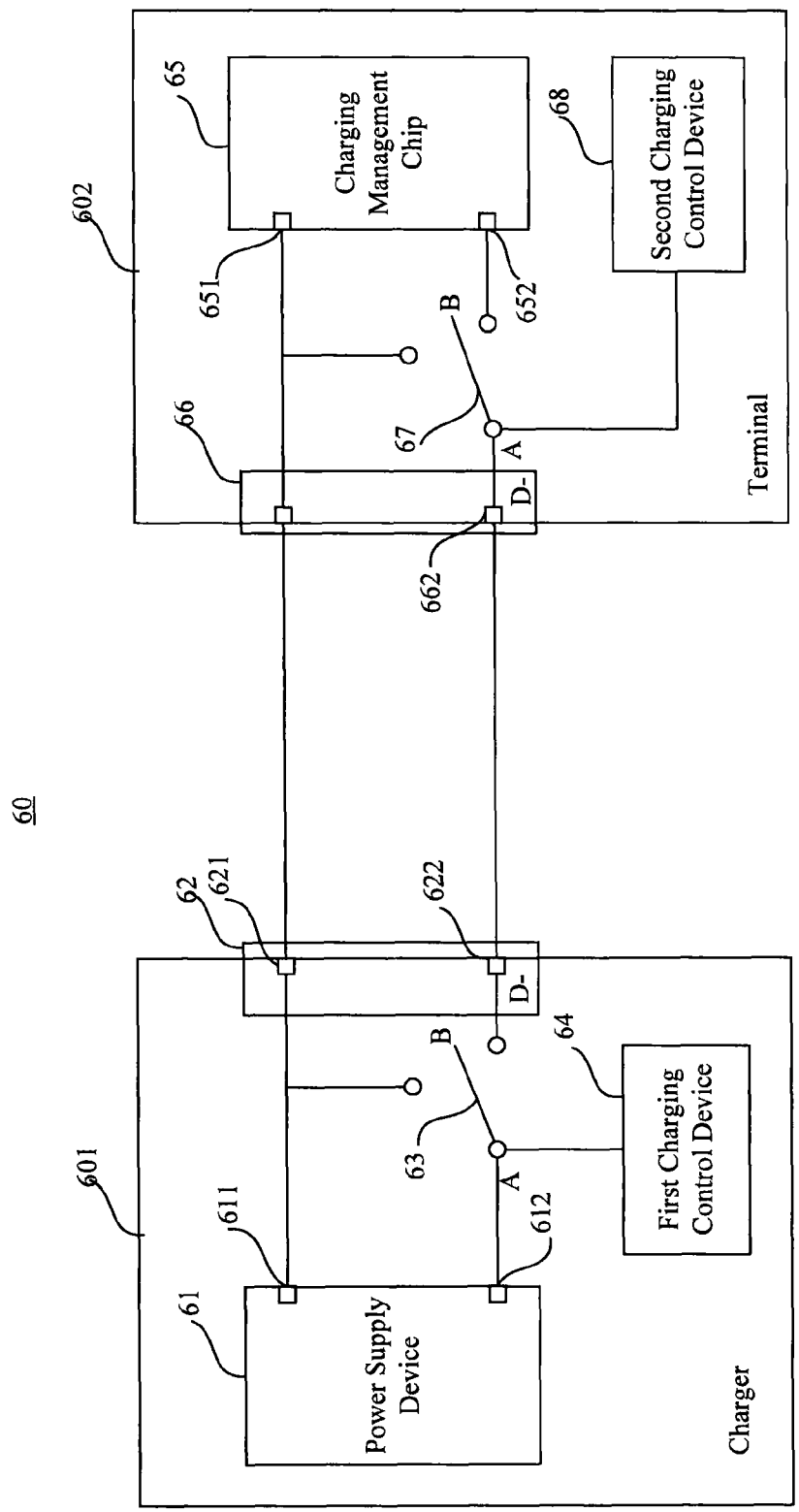
FIG. 6 is a block diagram of a charging system, according to an exemplary embodiment.

FIG. 6 is block diagram of a charging system 60, according to an exemplary embodiment. Referring to FIG. 6, the system 60 includes a charger 601 and a terminal 602, the charger 601 being configured to charge the terminal 602. The charger 601 includes a power supply device 61, a first charging port 62, a first switch device 63, and a first charging control device 64. The terminal 602 includes a charging management chip 65, a second charging port 66, a second switch device 67, and a second charging control device 68. The system 60 operates in a manner similar to the above description in connection with the system 30 (FIG. 3). In the system 60, a feedback signal is transmitted between the charger 601 and the terminal 602 through D− ports.

For example, the first switch device 63 of the charger 601 may be a SPDT switch. An end A of the SPDT switch 63 is connected with a feedback receiving port 612 of the power supply device 61, and an end B of the SPDT switch 63 is connected to a first power supply port 621 or a D-port 622 of the first charging port 62 according to control of the first charging control device 64. When a charging operation is started, the first charging control device 64 controls the end B of the SPDT switch 63 to be connected to the first power supply port 621 of the first charging port 62. After the charging operation lasts for a preset period, the first charging control device 64 controls the end B of the SPDT switch 63 to be connected to the D− port 622 of the first charging port 62.

The second switch device 67 of the terminal 602 may also be a SPDT switch. An end A of the SPDT switch 67 is connected with a D− port 662 of the second charging port 62, and an end B of the SPDT switch 67 is connected to a voltage input port 651 or a chip data port 652 of the charging management chip 65 according to control of the second charging control device 68. When the charging operation is started, the second charging control device 68 controls the end B of the SPDT switch 67 to be connected to the chip data port 652 of the charging management chip 65. After the charging operation lasts for the preset period, the second charging control device 68 controls the end B of the SPDT switch 67 to be connected to the voltage input port 651 of the charging management chip 65.

In this embodiment, the feedback signal is not directly transmitted to a voltage output port 611 of the power supply device 61, but to the SPDT switch 63. The end B of the SPDT switch 63 may be connected to the first power supply port 621 or the D− port 622 according to control of the control of the first charging control device 64.

The SPDT switch 67 is included in the terminal 602. The end A of the SPDT switch 67 is connected to the D− port 662 of the second charging port 66 (to be consistent with the charger 601), and the end B of the SPDT switch 67 is connected to the voltage input port 651 or the chip data port 652 of the charging management chip 65.

In this embodiment, by transmitting the feedback signal through the connection between the D− ports of the charger 601 and the terminal 602 the charging operation lasts for the preset period, so as to allow the feedback signal to reflect the voltage drop across the USB wire between the charger 601 and the terminal 602, the voltage drop across the USB wire between the terminal 602 and the charger 601 will be eliminated, such that a charging voltage of 5±5% V may be obtained at the voltage input port 651 of the charging management chip 65. Thus, the high voltage battery may be fast charged with a substantially constant current.

In exemplary embodiments, there is also provided a non-transitory storage medium having stored therein instructions that, when executed by one or more processors of any of the above-described charging systems, cause the charging system to perform the charging method 400 (FIG. 4).

In the above illustrated embodiments, the feedback signal may be obtained from the terminal, to eliminate the voltage drop across the USB wire between the terminal and the charger, such that a charging voltage of 5±5% V may be obtained at the voltage input port of the charging management chip of the terminal. Thus, the high voltage battery may be fast charged with a substantially constant current.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A charger for charging a terminal, comprising:
   a power supply device configured to output a direct current (DC) charging current by rectifying and reducing a voltage of an input alternating current (AC), the power supply device including a voltage output port and a feedback receiving port, the voltage output port being configured to output the DC charging current, the feedback receiving port being configured to receive a feedback signal to adjust the output DC charging current;
   a charging port configured to connect to the terminal, and to output the DC charging current from the power supply device to the terminal, the charging port including a power supply port and a data signal port, the power supply port being connected to the voltage output port and configured to output the DC charging current to the terminal;
   a charging control device; and
   a switch device provided between the feedback receiving port and the charging port, and configured to connect the feedback receiving port to the power supply port or the data signal port according to control of the charging control device, wherein:
   when the charger is in a proximal feedback state, the switch device connects the feedback receiving port to the power supply port according to the control of the charging control device; and
   when the charger is in a distal feedback state, the switch device connects the feedback receiving port to the data signal port according to the control of the charging control device.

2. The charger according to claim 1, wherein the data signal port comprises a D+ port and a D− port, and wherein when the charger is in the distal feedback state, the switch device connects the feedback receiving port to the D+ port or the D− port according to the control of the charging control device.

3. The charger according to claim 1, wherein
   the charging control device is configured to control the charger to be in the proximal feedback state when a charging operation is started, and control the charger to be in the distal feedback state when a duration of the charging operation exceeds a preset time period.

4. The charger according to claim 1, wherein the charging port is a universal serial bus (USB) interface or a micro USB interface.

5. A terminal to be charged by a charger, comprising:
   a charging management chip configured to receive an input direct current (DC) charging current to charge the terminal, the charging management chip including a voltage input port and a chip data port, the voltage input port being configured to receive the input DC charging current;
   a charging port configured to connect to the charger to receive a DC charging current from the charger as the input DC charging current to the charging management chip, the charging port including a power supply port and a data signal port, the power supply port being connected to the voltage input port and configured to output the received DC charging current to the charging management chip;
   a charging control device; and
   a switch device provided between the charging management chip and the charging port, and configured to connect the data signal port to the voltage input port or the chip data port according to control of the charging control device, wherein:
   when the terminal is in a proximal feedback state, the switch device connects the data signal port to the chip data port according to the control of the charging control device; and
   when the terminal is in a distal feedback state, the switch device connects the data signal port to the voltage input port according to the control of the charging control device.

6. The terminal according to claim 5, wherein the data signal port comprises a D+ port and a D− port, and wherein when the terminal is in the proximal feedback state, the switch device connects the D+ port or the D− port to the chip data port according to the control of the charging control device; and
   when the terminal is in the distal feedback state, the switch device connects the D+ port or the D− port to the voltage input port according to the control of the charging control device.

7. The terminal according to claim 5, wherein
   the charging control device is configured to control the terminal to be in the proximal feedback state when a charging operation is started, and control the terminal to be in the distal feedback state when a duration of the charging operation exceeds a preset time period.

8. The terminal according to claim 5, wherein the charging port is a universal serial bus (USB) interface or a micro USB interface.

9. A charging system, comprising:
   a terminal; and
   a charger configured to charge the terminal,
   wherein the charger comprises:
   a power supply device configured to output a direct current (DC) charging current by rectifying and reducing a voltage of an input alternating current (AC), the power supply device including a voltage output port and a feedback receiving port, the voltage output port being configured to output the DC charging current, and the feedback receiving port being configured to receive a feedback signal to adjust the output DC charging current;

a first charging port configured to connect to the terminal, and to output the DC charging current from the power supply device to the terminal, the first charging port including a first power supply port and a first data signal port, the first power supply port being connected to the voltage output port and configured to output the DC charging current to the terminal;

a first charging control device; and a first switch device provided between the feedback receiving port and the first charging port, and configured to connect the feedback receiving port to the first power supply port or the first data signal port according to control of the first charging control device;

wherein the terminal comprises:

a charging management chip configured to receive an input DC charging current to charge the terminal, the charging management chip including a voltage input port and a chip data port, the voltage input port being configured to receive the input DC charging current;

a second charging port configured to connect to the charger to receive the DC charging current from the charger as the input DC charging current to the charging management chip, the second charging port including a second power supply port and a second data signal port, the second power supply port being connected to the voltage input port, and configured to output the received DC charging current to the charging management chip;

a second charging control device; and a second switch device provided between the charging management chip and the second charging port, and configured to connect the second data signal port to the voltage input port or the chip data port according to control of the second charging control device; and wherein:

when the charging system is in a proximal feedback state, the first switch device connects the feedback receiving port to the first power supply port according to the control of the first charging control device, and the second switch device connects the second data signal port to the chip data port according to the control of the second charging control device; and when the charging system is in a distal feedback state, the first switch device connects the feedback receiving port to the first data signal port according to the control of the first charging control device, and the second switch device connects the second data signal port to the voltage input port according to the control of the second charging control device.

10. The charging system according to claim 9, wherein each of the first data signal port and the second data signal port comprises a D+ port, and wherein when the charging system is in the proximal feedback state, the second switch device connects the D+ port of the second data signal port to the chip data port according to the control of the second charging control device; and when the charging system is in the distal feedback state, the first switch device connects the feedback receiving port to the D+ port of the first data signal port according to the control of the first charging control device, and the second switch device connects the D+ port of the second data signal port to the voltage input port according to the control of the second charging control device.

11. The charging system according to claim 9, wherein each of the first data signal port and the second data signal port comprises a D− port, and wherein when the charging system is in the proximal feedback state, the second switch device connects the D− port of the second data signal port to the chip data port according to the control of the second charging control device; and when the charging system is in the distal feedback state, the first switch device connects the feedback receiving port to the D− port of the first data signal port according to the control of the first charging control device, and the second switch device connects the D− port of the second data signal port to the voltage input port according to the control of the second charging control device.

12. The charging system according to claim 9, wherein the first charging control device is configured to control the charger to be in the proximal feedback state when a charging operation is started, and control the charger to be in the distal feedback state when a duration of the charging operation exceeds a preset time period; and the second charging control device is configured to control the terminal to be in the proximal feedback state when the charging operation is started, and control the terminal to be in the distal feedback state when the duration of the charging operation exceeds the same preset time period.

13. The charging system according to claim 9, wherein the first charging port is a universal serial bus (USB) interface or a micro USB interface, and the second charging port is a USB interface or a micro USB interface.

14. A charging control method using the charging system according to claim 9, comprising:

when a charging operation is started, controlling the charging system to be in the proximal feedback state, including: controlling the first switch device to connect the feedback receiving port to the first power supply port using the first charging control device, and controlling the second switch device to connect the second data signal port to the chip data port using the second charging control device;

determining whether a duration of the charging operation exceeds a preset time period; and when the duration of the charging operation exceeds the preset time period, controlling the charging system to be in the distal feedback state, including: controlling the first switch device to connect the feedback receiving port to the first data signal port using the first charging control device, and controlling the second switch device to connect the second data signal port to the voltage input port using the second charging control device.

15. The charging control method according to claim 14, wherein when each of the first and second data signal ports includes a D+ port, the charging control method further comprises:

when the charging system is in the proximal feedback state, controlling the second switch device to connect the D+ port of the second data signal port to the chip data port using the second charging control device; and when the charging system is in the distal feedback state, controlling the first switch device to connect the feedback receiving port to the D+ port of the first data signal port using the first charging control device, and controlling the D+ port of the second data signal port to the voltage input port using the second charging control device.

16. The charging control method according to claim 14, wherein when each of the first and second data signal ports includes a D− port, the charging control method further comprises:

when the charging system is in the proximal feedback state, controlling the second switch device to connect the D− port of the second data signal port to the chip data port using the second charging control device; and when the charging system is in the distal feedback state, controlling the first switch device to connect the feedback receiving port to the D− port of the first data signal port using the first charging control device, and controlling the second switch device to connect the D− port of the second data signal port to the voltage input port using the second charging control device.

* * * * *